United States Patent
Yang

(10) Patent No.: US 11,373,574 B2
(45) Date of Patent: Jun. 28, 2022

(54) TRUE-COLOR DEVICE AND COLOR-VIEW METHOD

(71) Applicant: Acer Incorporated, New Taipei (TW)

(72) Inventor: Chun-Kai Yang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/988,106

(22) Filed: Aug. 7, 2020

(65) Prior Publication Data
US 2021/0125539 A1 Apr. 29, 2021

(30) Foreign Application Priority Data
Oct. 29, 2019 (TW) ................. 108138988

(51) Int. Cl.
*G09G 3/20* (2006.01)
*G06F 3/03* (2006.01)

(52) U.S. Cl.
CPC ........ *G09G 3/2003* (2013.01); *G06F 3/0304* (2013.01); *G09G 2320/0666* (2013.01); *G09G 2354/00* (2013.01)

(58) Field of Classification Search
CPC ........ G09G 3/2003; G09G 2320/0666; G09G 2354/00; G09G 5/02; G06F 3/0304; G06F 3/033; G06F 3/03545
USPC .................................. 345/156, 589
See application file for complete search history.

(56) References Cited

U.S. PATENT DOCUMENTS

| | | | | |
|---|---|---|---|---|
| 7,664,322 | B1* | 2/2010 | Wilensky | G06K 9/0061 382/181 |
| 2007/0285433 | A1* | 12/2007 | Wu | G09G 5/02 345/589 |
| 2011/0148902 | A1 | 6/2011 | Haga et al. | |
| 2015/0009154 | A1* | 1/2015 | Shih | G06F 3/03545 345/173 |
| 2018/0226055 | A1* | 8/2018 | Raymann | G06F 3/015 |
| 2019/0179431 | A1* | 6/2019 | Klein | G06F 3/03545 |

FOREIGN PATENT DOCUMENTS

| | | |
|---|---|---|
| CN | 102104793 A | 6/2011 |
| TW | 201546424 A | 12/2015 |

OTHER PUBLICATIONS

Chinese language office action dated Aug. 20, 2020, issued in application No. TW 108138988.

* cited by examiner

*Primary Examiner* — Amare Mengistu
*Assistant Examiner* — Gloryvid Figueroa-Gibson
(74) *Attorney, Agent, or Firm* — McClure, Qualey & Rodack, LLP

(57) ABSTRACT

A true-color device used to view a true color of a color displayed on a monitor. The true-color device includes a pointing device, configured to indicate a locating point on the monitor; a communication device, configured to receive color parameters sent by the monitor, wherein the color parameters are within a particular range centered on the locating point; a color-accurate monitor, configured to display a color according to the color parameters; and an input device, configured to control the display parameters of the color-accurate monitor to make the color-accurate monitor display the color according to the display parameters and the color parameters.

7 Claims, 3 Drawing Sheets

TRUE-COLOR DEVICE AND COLOR-VIEW METHOD

CROSS REFERENCE TO RELATED APPLICATIONS

This Application claims priority of Taiwan Patent Application No. 108138988, filed on Oct. 29, 2019, the entirety of which is incorporated by reference herein.

BACKGROUND OF THE INVENTION

Field of the Invention

The present invention relates to a true-color device, and, in particular, to a true-color device and viewing method for viewing a color displayed on a monitor.

Description of the Related Art

In order to improve the finished product, designers have extremely high requirements for color accuracy. Currently, most such products are designed using computers. Although the color parameters are the same, the color displayed on the computer monitor is likely to differ from the true color as it appears in the real world. This difference may make the finished product different from what the designer expects. For example, due to the color cast of a monitor, the color displayed on the monitor will be different from the true color seen by the human eye after the finished product is printed. Therefore, designers often use various methods for minimizing the difference between the color displayed on the computer monitor and the true color. For example, designers may utilize paper color chips, they may compare the color parameters presented on the monitor with the paper color chips, such that designers can confirm what a color displayed on the monitor will show in the real world after the color is printed. Alternatively, designers may utilize a monitor color corrector to calibrate the color accuracy of the monitor and then make the colors displayed on the monitor more accurate and closer to the true color.

However, the paper color chips are heavy and inconvenient to carry. In addition, it is necessary to compare the colors one by one, which is inconvenient in use. On the other hand, monitor color correctors need to be used regularly, and in order to achieve better results, they often need to be used with expensive color-accurate screens. Furthermore, only monitors that have been calibrated by a monitor color corrector can display accurate colors. Once the file of color is displayed on another monitor, the color as displayed may no longer be accurate. As described above, there is a need for a light-weight and low-cost device, which can be carried by designers and provide the function of confirming the true color of different monitors.

BRIEF SUMMARY OF THE INVENTION

An embodiment of the present disclosure provides a true-color device for viewing a true color of a color displayed on a monitor. The true-color device comprises a pointing device, configured to indicate a locating point on the monitor; a communication device, configured to receive color parameters within a particular range sent by the monitor, wherein the particular range is centered on the locating point; a color-accurate monitor, configured to display a color according to the color parameters; and an input device, configured to control display parameters of the color-accurate monitor to make the color-accurate monitor display the color according to the display parameters and the color parameters.

Another embodiment of the present disclosure provides a color-view method for viewing a true color of a color displayed on a monitor. The color-view method comprises indicating a locating point on the monitor by using a pointing device of a true-color device; receiving color parameters within a particular range of the monitor via a communication device of the true-color device, wherein the particular range is centered on the locating point; and displaying a color on a color-accurate monitor of the true-color device according to the color parameters.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion. It is also emphasized that the drawings appended illustrate only typical embodiments of this disclosure and are therefore not to be considered limiting in scope, for the disclosure may apply equally well to other embodiments.

DETAILED DESCRIPTION OF THE INVENTION

Figure 1:
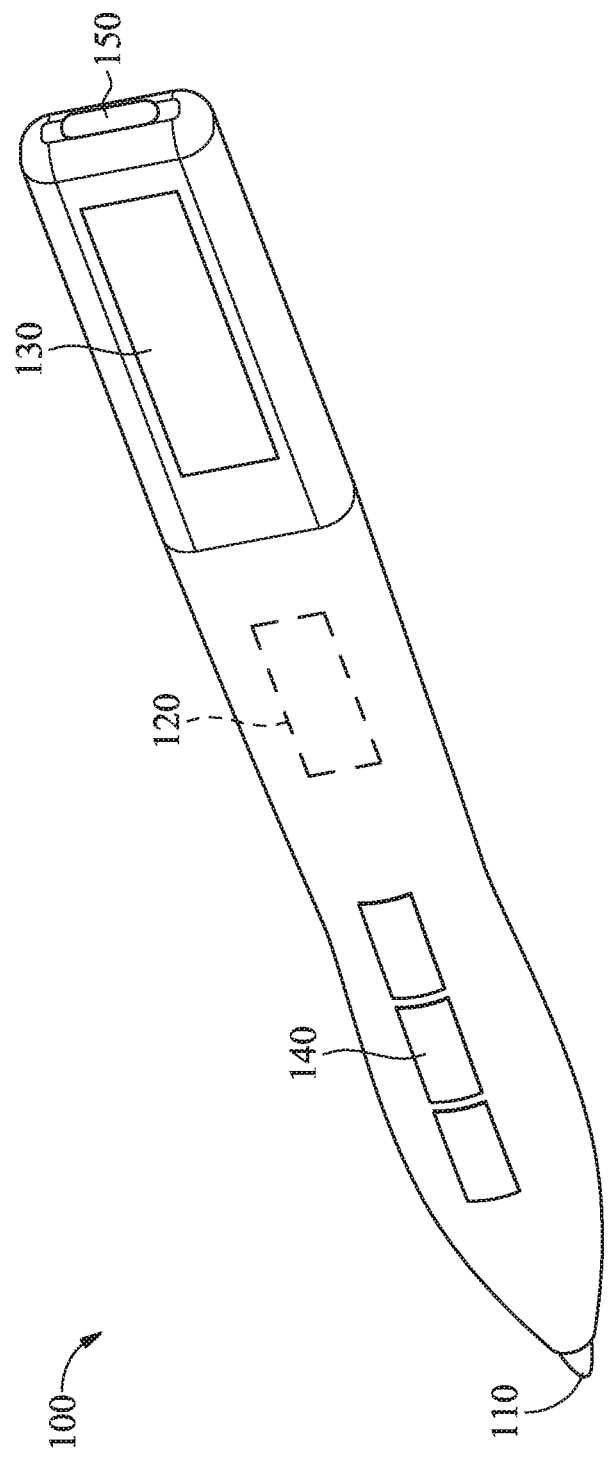
FIG. 1 shows a schematic diagram of the true-color device, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Still further, unless specifically disclaimed, the singular includes the plural and vice versa. And when a number or a range of numbers is described with "about," "approximate," and the like, the term is intended to encompass numbers that are within a reasonable range including the number described, such as within +/−10% of the number described or other values as understood by person skilled in the art. In addition, the present disclosure is not limited by the illustrated ordering of acts or events, as some acts may occur in different orders and/or concurrently with other acts or events. Furthermore, not all illustrated acts or events are required to implement a methodology in accordance with the present disclosure.

Some embodiments of the present disclosure provide a true-color device for solving the issues of prior art, such as the paper color chips are bulky and inconvenient to use, and the monitor color corrector is expensive and cannot be used for multiple monitors at the same time. The true-color device provides the true color of a color displayed on a monitor for users by obtaining color parameters of the color displayed on the monitor and displaying a color on a color-accurate monitor directly based on the color parameters.

FIG. 1 shows a schematic diagram of the true-color device 100, in accordance with some embodiments of the resent disclosure. It should be emphasized that, in the present disclosure, the true-color device 100 is presented in the form of a pen, but is not limited thereto. The true-color device 100 comprises a pointing device 110, a communication device 120, a color-accurate monitor 130, and an input device 140. In some embodiment, true-color device 100 further comprises a color temperature sensor 150.

The pointing device 110 may be a tip of stylus pen, the material of the tip may be silicone, conductive fiber, resin, or other suitable materials. The pointing device 110 is configured to indicate a locating point on a monitor, wherein the locating point is the position where users want to view the true color. For example, when a monitor displays an image, if users want to view the true color of a particular position of the image, the pointing device 110 can be used to click on the particular position to indicate the particular position as the locating point. It should be noted that, depend on the difference of design of pointing device 110 and the monitor, the pointing device 110 may indicate the particular position by way of contacting the monitor directly or indirectly.

The communication device 120 is configured to receive the color parameters of the locating point. For example, the communication device receives RGB values from the monitor, wherein the RGB values represent the color of the locating point of the image displayed on the monitor.

A color-accurate monitor 130 is a monitor that was accurately calibrated when it was manufactured, so that the colors it displays are more accurate and closer to the true colors they represent. In the embodiments of the present disclosure, the color-accurate monitor is a monitor with ΔE of less than 1 under the definition of CIEDE2000 of the International Commission on Illumination. However, depending on different requirements, the color-accurate monitor 130 may also use a monitor with different color accuracy, or use a monitor with a color accuracy defined under different standards. The color-accurate monitor 130 is configured to display the color according to the color parameters (e.g. RGB values) received by the communication device 120, and then users can view the color through the color-accurate monitor 130. The color-accurate monitor is a monitor that has been accurately calibrated, for example, the monitor may be a plasma display, a liquid-crystal display (LCD), a light-emitting diode (LED) display, or other suitable displays.

The input device 140 may be physical button(s) or touch screen. The input device 140 is configured to control the display parameters of the color-accurate monitor, such as color temperature parameter, color space parameter, and/or color range parameter, but is not limited thereto. In some embodiments, the input device 140 comprises a white balance adjusting button (not shown). The white balance adjusting button is configured to adjust the color temperature parameter of the color-accurate monitor 130, such that the color-accurate monitor 130 displays the color according to the color parameters received by the communication device 120 and the different color temperatures. In this way, the true-color device 100 can simulate the true color presented with the same color parameters under the environments having different color temperatures.

For example, if a color displayed on a monitor will be exhibited in an exhibition hall with a color temperature of incandescent lamp (about 2800K), the color temperature of the color-accurate monitor 130 can be adjusted to the incandescent lamp through the white balance adjusting button. In this way, the color-accurate monitor 130 can simulate how the true color of the color displayed on the monitor will be presented under the color temperature of the incandescent lamp. The white balance adjusting button enables the color-accurate monitor 130 to switch among the following color temperatures: candle, incandescent lamp, halogen lamp, moonlight, daylight, average daylight, xenon arc lamps, and/or fluorescent lamp, but is not limited thereto.

The input device 140 can be used with the color temperature sensor 150. In some embodiments, the input device 140 further comprises a color temperature-sensing button (not shown). The color temperature-sensing button is configured to boost the color temperature sensor 150 for detecting the environment color temperature of the present environment. In some embodiments, in addition to the various color temperatures described above, the color temperatures that can be switched by the white balance adjusting button also include the environment color temperature detected by the color temperature sensor 150. By detecting the environment color temperature and causing the color-accurate monitor 130 to display the color according to the environment color temperature, the color-accurate monitor 130 can more accurately display the true color.

For example, if a specific color displayed on a monitor will be exhibited in a particular exhibition hall, the color temperature sensor 150 can be used to detect an environment color temperature of the particular exhibition hall in advance. Thereafter, in other environments (e.g. studio of the user), the color temperature of the color-accurate monitor 130 can be adjusted to the environment color temperature of the particular exhibition hall by using the white balance adjusting button. In this way, the color-accurate monitor 130 can simulate how the true color of the specific color will be represented under the environment color temperature of the particular exhibition hall.

In some embodiments, the input device 140 comprises a color space adjusting button (not shown). The color space adjusting button is configured to switch the color space parameter of the color-accurate monitor 130, such that the color-accurate monitor 130 can display the color according to the color parameters received by the communication device 120 and the different color space. In this way, the true-color device 100 can simulate the true color presented with the same color parameters under the environments having different color temperatures, without being limited by the color space of the monitor itself that provides the color parameters.

For example, a monitor displays Adobe RGB color space and a printer can output sRGB color space only, if a user want to view how a color displayed on the monitor will look after being printing by the printer, the user can switch the color space of the color-accurate monitor 130 to sRGB through the color space adjusting button. In this way, the color-accurate monitor 130 can display the true color under an sRGB color space. The color space adjusting button enables the color-accurate monitor 130 to switch among the following color spaces: DCI-P3, Adobe RGB, sRGB, Rec.709, and/or Rec.2020, but is not limited thereto.

In some embodiments, the input device 140 comprises a color range adjusting button. The color range adjusting button is configured to change the area indicated by the pointing device 110, wherein the area refers to an area within a particular range centered by the locating point indicated by the pointing device 110. In this way, the color-accurate monitor 130 can display an accurate color within a very small area, or display an overall color within a large area. When the area of a particular range is a (one) pixel, the color parameters received by the communication device 120 is the RGB values of the pixel, wherein the particular range is centered on the locating point indicated by the pointing device 110. When the area of the particular range is larger than one pixel, the color parameters received by the communication device 120 is the resulting RGB values, wherein this resulting RGB values is generated by calculating RGB values of all pixels in the particular range through Gaussian Blur or other suitable image processing.

In some embodiments, while displaying the color, the color-accurate monitor further displays some parameters currently used, such as color temperature parameter, color space parameter, and/or color range, but is not limited thereto.

Figure 2:
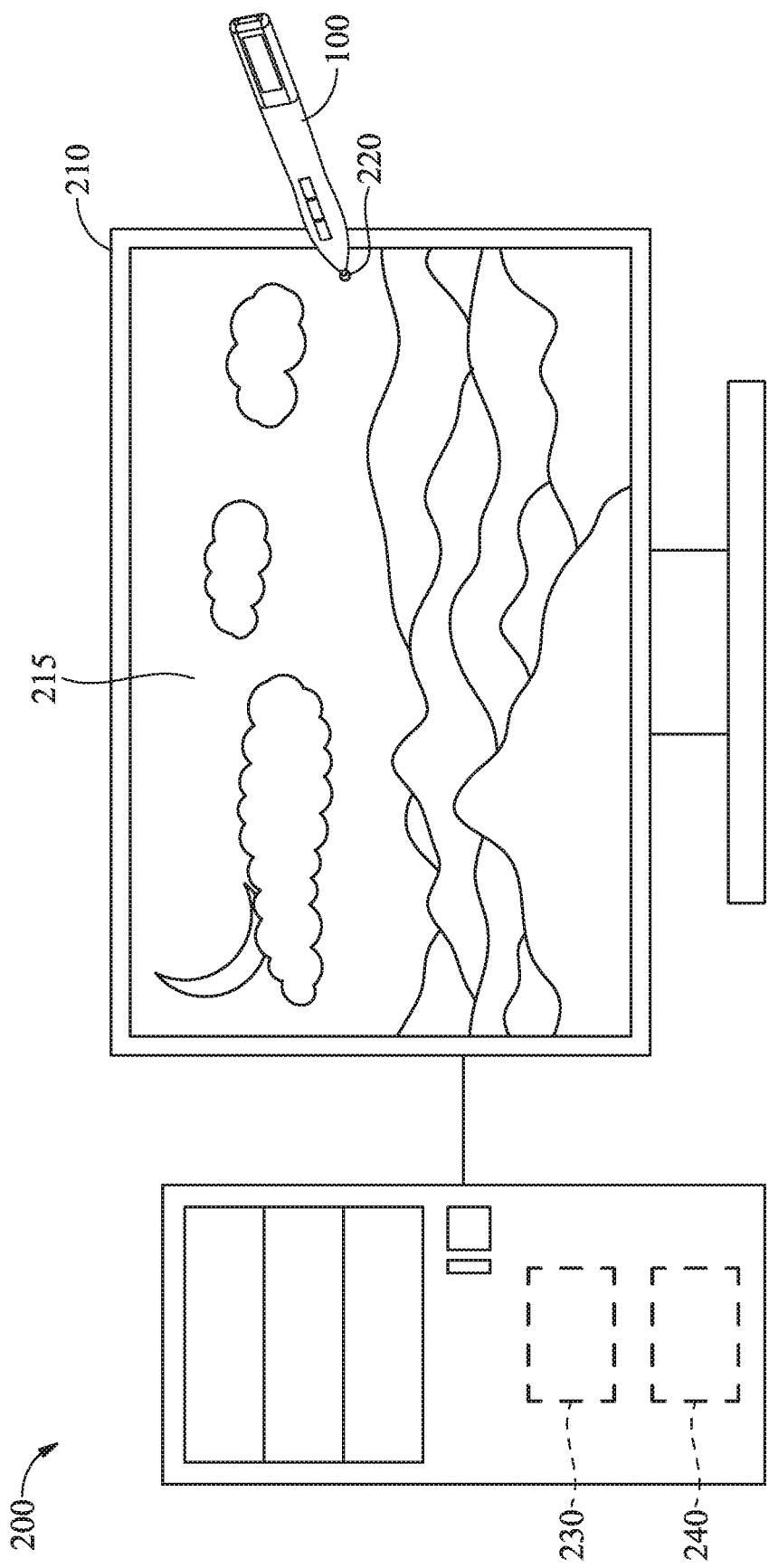
FIG. 2 shows a schematic diagram of the operating of the true-color device, in accordance with some embodiments of the present disclosure.

FIG. 2 shows a schematic diagram of the operating of the true-color device 100, in accordance with some embodiments of the present disclosure. The electronic device 200 comprises a monitor 210, a processing device 230 coupled with the monitor 210, and a communication device 240 coupled with the monitor 210. It should be noted that, although the electronic device 200 is presented in the form of a monitor in the present disclosure, the electronic device 200 may be a desktop computer, a notebook computer, a tablet computer, a smart phone, or other electronic device having a touch screen.

In FIG. 2, the monitor 210 displays the image 215. Referring to FIG. 1 and FIG. 2 at the same time, when a user wants to view the true color of a color displayed at a desired point, the user can utilize the pointing device 110 (FIG. 1) of the true-color device 100, wherein the desired point is in the image 215 displayed on the monitor 210. The pointing device 110 can be used to directly or indirectly contact the desired point to indicate the desired point as a locating point 220.

Next, after the processing device 230 detects that the locating point 220 is indicated, the processing device 230 obtains and/or calculates the color parameters (e.g. RGB values) of the locating point 220 in the image 215. Subsequently, the processing device 230 sends the calculated color parameters of the locating point 220 to the true-color device 100 through the communication device 240, for example, sends to the communication device 120 (FIG. 1) of the true-color device 100. In some embodiments, the communication device 240 and the communication device 120 may be connected to each other in a wireless and/or wired manner. In some embodiments, when the pointing device 110 clicks on the locating point 220, the locating point 220 is immediately indicated as the locating point, and the processing device 230 then starts to calculate the color parameters. In other embodiments, the input device 140 (FIG. 1) of the true-color device 100 further comprises an indicating button (not shown). Only after the pointing device 110 clicks on the locating point 220 and the above-mentioned indicating button is pressed, the locating point 220 will be indicated as the locating point, and the processing device 230 will start to calculate the color parameters.

After receiving the color parameters of the locating point 220, the color-accurate monitor 130 of the true-color device 100 displays the color according to the color parameters of the locating point 220. Then, the display parameters of the color-accurate monitor 130 can be controlled by the input device 140 (FIG. 1), such that the color-accurate monitor 130 may display the color according to the color parameters of the locating point 220 and the display parameters at the same time. For example, after adjusting the color temperature parameter of the color-accurate monitor 130 with the white balance adjusting button, the color-accurate monitor displays the color according to the color parameters of the locating point 220 and the current color temperature parameter. For example, after adjusting the color space parameter of the color-accurate monitor 130 with the color space adjusting button, the color-accurate monitor displays the color according to the color parameters of the locating point 220 and the current color space parameter. The color-accurate monitor 130 can display the color according to different color temperature parameter and color space parameter at the same time.

In some embodiments, the color temperature sensor 150 of the true-color device 100 can be used to obtain the environment color temperature of other environments. For example, if the image 215 displayed on the monitor 210 is to be exhibited in a particular exhibition hall, the color temperature sensor 150 can be used to obtain an environment color temperature of the particular exhibition hall in advance. Next, the color temperature parameter of the color-accurate monitor 130 can be switched to the environment color temperature of the particular exhibition hall by input device 140. In this way, the color-accurate monitor 130 can display the color according to the color parameters of the locating point 220 and the environment color temperature of the particular exhibition hall. By detecting the environment color temperature in the field, the true-color device 100 can obtain more accurate color temperature parameter.

In some embodiments, the color range adjusting button of the input device 140 can be used to change the color area (the area of a particular range centered on the locating point 220) indicated by the true-color device 100. For example, when the color area is the smallest, the color area is the pixel at the center of the locating point 220, and the processing device 230 calculates the color parameters of the pixel and sends the color parameters to the true-color device 100. When the color area is larger than one pixel (e.g. a circle centered on the locating point 220 with a radius of N pixels, or a rectangle centered on the locating point 220 with N×M pixels, where N and M are positive integers greater than 1), the processing device 230 calculates the color parameters of all pixels (e.g. RGB values of all pixels) in the color area by using Gaussian blur or other suitable image processing methods. After calculating, the processing device 230 generates a particular color parameter set (e.g. a set of RGB values) and sends this particular color parameter set to the true-color device 100 through the communication device 240.

Figure 3:
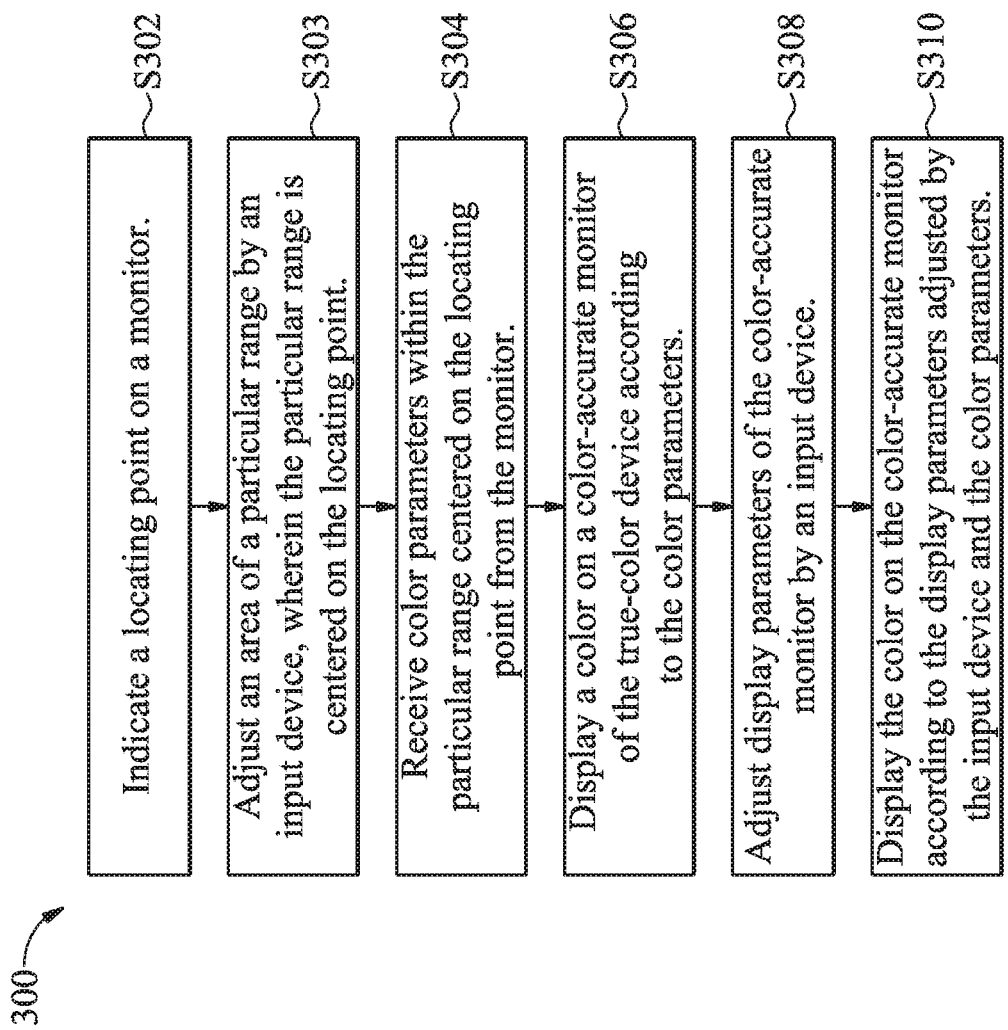
FIG. 3 shows a flow chart of color-view method for viewing true color by using true-color device, in accordance with some embodiments of the present disclosure.

FIG. 3 shows a flow chart of color-view method 300 for viewing true color by using true-color device 100, in accordance with some embodiments of the present disclosure. In operation S302, the color-view method 300 may indicate a locating point on a monitor whose color is to be viewed. For example, the locating point 220 may be indicated on the image 215 by the pointing device 110 of the true-color device 100, wherein the image 215 is displayed on the monitor 210.

In operation S303, The color-view method 300 may adjust an area of a particular range by an input device, wherein the particular range is centered on the locating point. For example, the color area (i.e. the area of a particular range centered on the locating point 220) of the true-color device 100 may be changed by using the color range adjusting button of the input device 140. In some embodiments, operation S303 may be performed before operation S302.

In operation S304, the color-view method 300 may receive color parameters within the particular range centered on the locating point from the monitor. For example, the processing device 230 coupled with the monitor 210 calculates the color parameters at the locating point 220, and the calculated color parameters of the locating point 220 are sent to the true-color device 100 (received by the communication device 120) by the communication device 240. In some embodiments, when the area of the particular range indicated in the operation S303 is greater than a (one) pixel, the processing device 230 calculates color parameters of all pixels of the color range and generates a particular color parameter set by Gaussian Blur or other suitable image processing methods. The particular color parameter set is then sent to the true-color device 100.

In operation S306, the color-view method 300 may display the color parameters received in the operation S304 in the form of a color by a color-accurate monitor. For example, after receiving the color parameters of the locating point 220, the color-accurate monitor 130 of the true-color device may be used to display a color according to the color parameters of the locating point 220.

In operation S308, the color-view method 300 may adjust display parameters of the color-accurate monitor by an input device. For example, the white balance adjusting button and the color space adjusting button of the input device 140 may be used to adjust the color temperature parameter and the color space parameter of the color-accurate monitor 130, respectively. The color temperature parameter may comprise candle, incandescent lamp, halogen lamp, moonlight, daylight, average daylight, xenon arc lamps, and/or fluorescent lamp, but is not limited thereto. The color space parameter may comprise DCI-P3, Adobe RGB, sRGB, Rec.709, and/or Rec.2020, but is not limited thereto.

In operation S310, the color-accurate monitor may display the color according to the display parameters adjusted in the operation S308 and the color parameters received in the operation S304. In this way, the color-accurate monitor can display the color with the same color parameters under different color temperature and different color space. For example, when the color temperature parameter is adjusted to incandescent lamp and the color space parameter is adjusted to Adobe RGB, the color-accurate monitor 130 will display the color of color parameters of the locating point 220 under incandescent lamp and Adobe RGB.

In some embodiments, the color-view method 300 further comprises a color temperature-sensing operation (not shown). The color temperature-sensing operation may be performed before or after the color-view method 300, or between any two operations of the color-view method 300. The color temperature-sensing operation may detect the environment color temperature of the present environment, such that the environment color temperature may be included in the color temperature parameters adjusted in the operation S308. For example, by using the color temperature sensor 150 of the true-color device 100, the desired color temperature may be detected before the operation S302 or after the operation S306. The color-accurate monitor then may display the color according to the detected desired color temperature and the color temperature of the locating point 220.

It should be emphasized that for the purpose of clarity, some devices, such as processing device, power, memory, and a like, are not depicted on the true-color device 100. However, those skilled in the art should be able to realize the functions of these devices, and install these devices on the true-color device 100 and achieve the same functions as described herein without departing from the scope and spirit of the present disclosure. In addition, additional operations may be provided before, during, or after the color-view method 300, and some of the operations described may be replaced, eliminated, or moved for other embodiments of the method.

The embodiments of the present disclosure provide a true-color device and a color-view method using the true-color device. By using the true-color device, professional creators can easily and quickly view the true color of the color displayed on the monitor, and view the true color of the color displayed on the monitor under different color temperatures and color spaces at the same time. In addition, by using the true-color device, color temperatures of different environments can be detected, such that professional creators can view the true color of the color displayed on the monitor under different environments.

On the other hand, the true-color device can be continuously used for a plurality of monitors to avoid misjudgment caused by color differences between different monitors and replacement of new monitors. In addition, the true-color device can be easily carried by professional creators, therefore it can avoid the trouble of carrying heavy paper color chips and the cost of purchasing a large number of expensive color-accurate monitors.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A true-color device for viewing a true color of a color displayed on a monitor, comprising:
 a pointing device, configured to touch the monitor to indicate a locating point on the monitor;

a communication device, configured to receive color parameters within a particular range sent by the monitor, wherein the particular range is centered on the locating point;

a color-accurate monitor, configured to display a color according to the color parameters;

an input device, configured to control display parameters of the color-accurate monitor, wherein the input device comprises a color space adjusting button, the color space adjusting button is configured to switch a color space parameter of the display parameters, the input device makes the color-accurate monitor display the color according to the color space parameter and the color parameters, and wherein the color space parameter comprises one or more of DCI-P3, Adobe RGB, sRGB, Rec. 709, and Rec. 2020; and a color range adjusting button included in the input device, the color range adjusting button is configured to switch an area of the particular range.

2. The true-color device as claimed in claim 1, further comprising a color temperature sensor, configured to detect an environment color temperature of a present environment.

3. The true-color device as claimed in claim 2, wherein the input device comprises a white balance adjusting button, the white balance adjusting button is configured to adjust a color temperature parameter of the display parameters, so that the color-accurate monitor displays the color according to the color temperature parameter and the color parameters, wherein the color temperature parameter comprises one or more of candle, incandescent lamp, halogen lamp, moonlight, daylight, average daylight, xenon arc lamp, fluorescent lamp, and the environment color temperature.

4. The true-color device as claimed in claim 1, further comprising:

an electronic device, comprising the monitor, a processing device, and a second communication device, wherein the electronic device is configured to calculate the color parameters within the particular range through the processing device when the locating point is indicated, and to send the color parameters to the communication device through the second communication device.

5. A color-view method for viewing a true color of a color displayed on a monitor, comprising:

touching the monitor to indicate a locating point on the monitor by using a pointing device of a true-color device;

receiving color parameters within a particular range of the monitor via a communication device of the true-color device, wherein the particular range is centered on the locating point;

adjusting an area of the particular range by a color range adjusting button;

calculating the color parameters according to Gaussian Blur when the area is greater than a pixel;

switching a color space parameter of the color-accurate monitor by using a color space adjusting button, wherein the color space parameter comprises one or more of DCI-P3, Adobe RGB, sRGB, Rec. 709, and Rec. 2020; and displaying a color on a color-accurate monitor of the true-color device according to the color parameters and the color space parameter.

6. The color-view method as claimed in claim 5, further comprising:

detecting an environment color temperature of a present environment by using a color temperature sensor; and displaying the color on the color-accurate monitor according to the color parameters and the environment color temperature.

7. The color-view method as claimed in claim 5, further comprising:

adjusting a color temperature parameter of the color-accurate monitor by using a white balance adjusting button; and displaying the color on the color-accurate monitor according to the color parameters and the color temperature parameter, wherein the color temperature parameter comprises one or more of candle, incandescent lamp, halogen lamp, moonlight, daylight, average daylight, xenon arc lamp, fluorescent lamp, and an environment color temperature.

* * * * *